United States Patent
McKay

(10) Patent No.: US 8,887,232 B2
(45) Date of Patent: Nov. 11, 2014

(54) CENTRAL BIOMETRIC VERIFICATION SERVICE

(75) Inventor: Sean McKay, High Bridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 150 days.

(21) Appl. No.: 13/406,044

(22) Filed: Feb. 27, 2012

(65) Prior Publication Data

US 2013/0227664 A1     Aug. 29, 2013

(51) Int. Cl.
    *G06F 7/04*         (2006.01)
(52) U.S. Cl.
    USPC ................. 726/2; 726/3; 726/4; 726/5
(58) Field of Classification Search
    None
    See application file for complete search history.

(56) References Cited

U.S. PATENT DOCUMENTS

| | | | |
|---|---|---|---|
| 6,199,113 B1 * | 3/2001 | Alegre et al. | 709/229 |
| 7,689,832 B2 * | 3/2010 | Talmor et al. | 713/186 |
| 7,966,489 B2 * | 6/2011 | Cam-Winget et al. | 713/163 |
| 2002/0046349 A1 * | 4/2002 | Saito | 713/201 |
| 2006/0080547 A1 * | 4/2006 | Higashiura et al. | 713/186 |
| 2007/0016795 A1 * | 1/2007 | Asano | 713/182 |
| 2009/0282466 A1 * | 11/2009 | Uchida | 726/7 |
| 2010/0077457 A1 * | 3/2010 | Xu et al. | 726/4 |
| 2011/0179284 A1 * | 7/2011 | Suzuki et al. | 713/186 |

* cited by examiner

*Primary Examiner* — Peter Poltorak

(57) ABSTRACT

Based on information on a biometric print of a user of a mobile device and user associated identification, the user is biometrically authenticated over a network for access to an online service. When a request from the user for access to an online service is received, a server checks the identification to determine if the user or mobile device is registered for a biometric based verification service. If registered, a sample biometric print is obtained from the user and compared to a stored template biometric print of the authorized user associated with the mobile device to determine if there is a match. When there is a match, the user is biometrically authenticated and is granted access to the online service.

18 Claims, 6 Drawing Sheets

CENTRAL BIOMETRIC VERIFICATION SERVICE

BACKGROUND

In recent years, digital communication services have expanded and increased in popularity around the world. Many advanced networks offer various wireless mobile communication services for voice and data communications and enable users of mobile devices to access various websites providing online services. The data services, for example, enable surfing the world wide web via a browser on a mobile device and connecting to various websites, such as banks, retail stores, etc. for various online services over the Internet. Over the past years, online business has grown to multi-billion dollars business, and more and more people are connecting online for doing business with an ever broadening range of enterprises.

When a user of a mobile device connects to a website for an online service, the user enters a set of customer data (e.g., username, password and/or personal verification data, specific to the online service provider) to do related business over the Internet. When the user connects to a bank, for example, the user enters a username and password that has been set up in advance with the online banking service or site. When the user connects to an online retail store, the user enters another set of customer data (e.g., username, password and/or personal verification data, specific to the online retail store) to shop at the store. Similar user credentials are used to access other services. As a result, the user has to keep a list of different accounts with applicable usernames and passwords in a safe place that is handy for use. However, because of the ever-increasing number of online services, it may become an overwhelming task for the user to keep track of all of the personal verification data and account information in a safe, secure manner.

As a result of the number of accounts with different credentials, users often forget login account and password information for gaining access to online services offered by an enterprise and request to reset account and password information in order to obtain the online services. Such requests for resets of passwords and account information by the user may result in delayed service by the enterprise. Frequent reset requests by users create a burden on system operation by the enterprise and additional costs (e.g., additional costs of supporting resets of passwords and account information). Further, there are increasing concerns for security breach in using the username and password techniques over a network, because the username and password information can be lost or intercepted and used by someone other than the authorized user, without knowledge of the user.

A mobile device can be programmed to remember usernames and passwords for particular online services. This improves user convenience but may not reduce security concerns for the enterprise, for example, the mobile device can be misused by another person who obtains the mobile device surreptitiously from the user.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
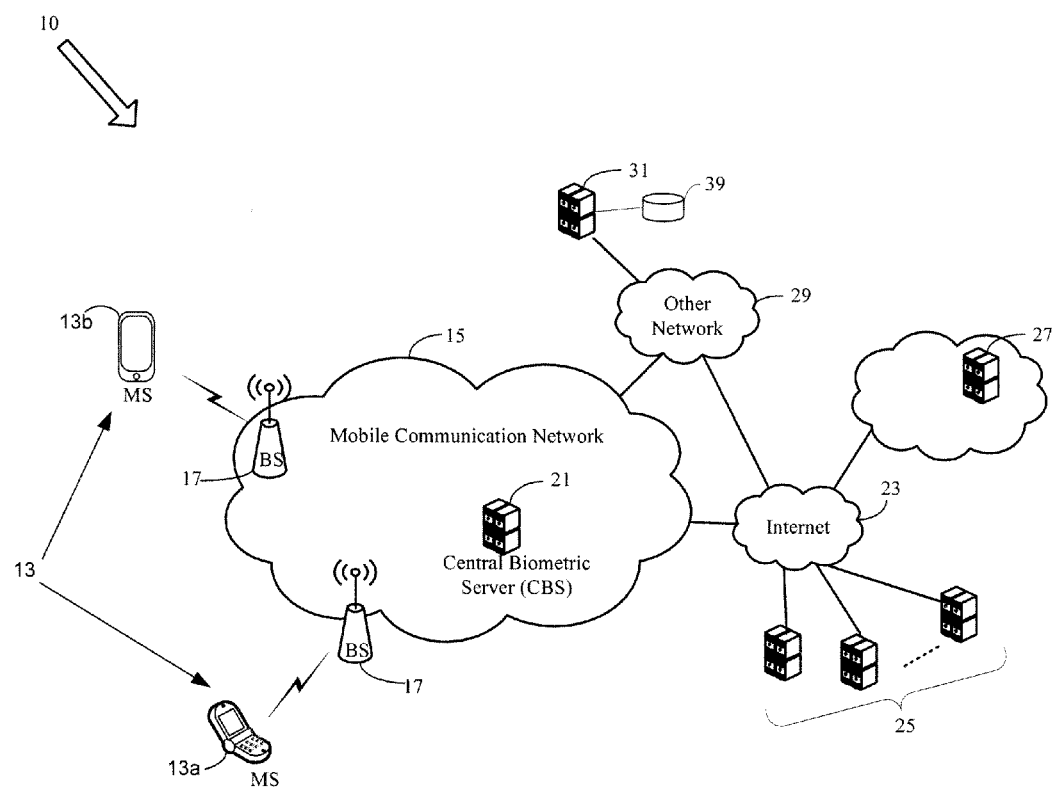
FIG. 1 is a high-level functional block diagram of an exemplary system of networks/devices that provide various communications for mobile devices and support an exemplary technique for providing a central biometric verification service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The examples discussed herein provide techniques for reducing or eliminating the burden of keeping track of various login account and password information for obtaining online services over a network, based on a combination of identification of a mobile device and biometric print(s) of a mobile device user. Here, the term "mobile device" is used generally to mean any mobile communication equipment including a mobile device or phone. The term "biometric print" is used herein to mean biometric information about a person, such as voice sample(s), fingerprint(s), retinal image(s), etc. that uniquely distinguish and identify one person from another. The term "enterprise" is used herein to mean any organization that offers an online service, such as a company, government, private or public organization, or the like to users of mobile devices over a network.

In the examples discussed below, a user of the mobile device makes a request for obtaining access to an online service, for example, a service provided by an enterprise such as a company, government, or organization over a network. The request includes identification information associated with the user, such as the mobile directory number of the mobile device. Based on the identification information, whether or not the user is a registered user of a biometric based verification service is determined. If the user is a registered user for the biometric based verification service, a request for a sample biometric print of the user is sent over the network to the mobile device. Responsive to the request, a sample biometric print of the user is received from the mobile device over the network for biometric verification purposes. Based on the received sample biometric print of the user, whether or not the user is an authorized user of the online service is determined.

In another example, at a central biometric server, a sample biometric print of a user of a mobile device over a network is received. The sample biometric print of the user is provided by an application server for access by the user to an online service offered by the application server. At the central biometric server, a plurality of records are accessed, wherein each record includes a template biometric print of a user, identification information of an enterprise, and access information of the user for the enterprise, at least some of the records associated with different enterprises. Based on whether or not the sample biometric print matches the template biometric print in one of the records, it is determined at the central biometric server whether or not the user is an authorized user of the online service. The result of the determination is sent from the central biometric server to the application server.

Further, an enterprise server is equipped with capability for providing biometric based authentication of a user of a mobile device before allowing the user access to an online service offered by the enterprise. The enterprise server includes an interface for network communication, a processor coupled to the interface, a program for the processor, and storage for the program. Execution of the program by the processor of the enterprise server configures the enterprise server to perform various biometric based verification functions. For example, the enterprise server is configured to receive a request from a user of a mobile device over a network for access to an online service over the network. The request includes identification information associated with the user, such as an identification of the user and a mobile directory number or serial number of the mobile device. Based on the received identification information in the request, the enterprise server determines whether or not the user of the mobile device is a registered user of a biometric based verification service. If the user is a registered user of the biometric based verification service, the enterprise server sends to the mobile device a request for a sample biometric print from the user. Responsive to the request for a sample biometric print, the enterprise server receives over the network a sample biometric print of the user for verification purposes.

Also, a server of a mobile communication service provider is provided for provisioning biometric based verification services over a network. The server of the mobile communication service provider includes an interface for communication with servers of enterprises other than the mobile communication service provider, a processor coupled to the interface, a non-transitory storage device, programming in the non-transitory storage device for execution by the processor, and a database in the non-transitory storage device. The interface of the server of the mobile communication service provider communicates with the servers of enterprises offering online services to users of mobile devices of customers of the mobile communication service provider. The database in the non-transitory storage device includes records for users of the mobile devices that utilize a biometric verification service provided by the server of the mobile communication service provider. Further, each record for a user includes identification information associated with the user and a template biometric print of the user. The template biometric print of the user is received from a mobile device of the user through a network of the mobile communication service provider for use in biometric authentication of the user upon an attempt by the user to access any of the online services offered by the servers of the enterprises.

As a result, the disclosed exemplary techniques herein may lead to increased satisfaction of the mobile device users, since the users no longer need to remember endless username and password combinations (or personal verification data) and need not worry as much about their identity theft when they access the online services offered by the enterprises over the network. Also, the disclosed exemplary techniques may decrease the costs of maintaining information technology associated with resetting login account and password information because of the use of biometric prints of the users.

Reference now is made in detail to the examples illustrated in the accompanying drawings and discussed below.

FIG. 1 illustrates a system 10 offering a variety of mobile communication services, including wireless communications for voice, data, and mobile messaging services. For the purposes of simplicity, the example illustrates only two mobile devices (MSs) 13a and 13b and other networks including a mobile communication network 15. The exemplary system 10 also offers a centralized biometric based user verification or authentication service.

The mobile devices 13 (13a and 13b) are examples of computing devices that may be used for various voice communications, data communications, and mobile messaging services. In the example, the mobile devices 13 include mobile phones or mobile stations, personal computers, tablet computers, electronic readers, other mobile computing devices, or the like. The mobile communication network 15 provides mobile wireless communications services to those mobile devices as well as to other mobile devices (not shown), for example, via a number of base stations (BSs) 17. The present techniques may be implemented in any of a variety of available mobile communication networks 15 and/or on any type of mobile device compatible with such a mobile communication network 15. For the purposes of discussion herein, however, only a few relevant elements of the mobile communication network 15 are illustrated.

In the example, the mobile communication network 15 might be implemented as a network conforming to the code division multiple access (CDMA) type standard, the 3rd Generation Partnership Project 2 (3GPP2) standard, the Evolution Data Optimized (EVDO) standard, the Global System for Mobile communication (GSM) standard, the 3rd Generation (3G) telecommunication standard, the 4th Generation (4G) telecommunication standard, the Long Term Evolution (LTE) standard, or other telecommunications standards used for public or private mobile wireless communications. The mobile devices 13 (13a and 13b) are capable of conventional voice telephone and data communications.

The mobile devices 13 can take the form of portable handsets, smart-phones or personal digital assistants, electronic readers, tablet devices or the like, although they may be implemented in other form factors. The mobile devices 13 execute various stored mobile applications on the devices. An application running on a mobile device 13a or 13b may be configured to execute on many different types of the mobile devices. For example, a mobile application can be written to execute in an iOS or Android operating system, or on a binary runtime environment for a BREW-based mobile device, a Windows Mobile based mobile device, Java Mobile, or RIM based mobile device (e.g., Blackberry), or the like. Some of these types of mobile devices can employ a multi-tasking operating system as well.

The mobile communication network 15 can be implemented by a number of interconnected networks. Hence, the mobile communication network 15 may include a number of radio access networks (RANs), as well as regional ground networks interconnecting a number of RANs and a wide area network (WAN) interconnecting the regional ground networks to core network elements. A regional portion of the network 15, such as that serving mobile devices 13, can include one or more RANs and a regional circuit and/or packet switched network and associated signaling network facilities.

Physical elements of a RAN operated by a mobile service provider, or carrier, include a number of base stations represented in the example by the base stations (BSs) 17. Although not separately shown, such a base station 17 can include a base transceiver system (BTS), which can communicate via an antennae system at the site of the base station 17 and over the air with one or more of the mobile devices, when the mobile devices are within a range. Further, each base station 17 includes a BTS coupled to several antennae mounted on a radio tower within a coverage area often referred to as a "cell." The BTS is the part of the radio network that sends and receives radio frequency (RF) signals to/from the mobile devices 13 that are served by the base station 17.

The radio access networks can also include a traffic or mobile communication network represented generally by the cloud at 15, which carries the user communications and data for the mobile devices 13 between the base stations 17 and other elements with or through which the mobile devices 13 communicate. In some examples, the mobile communication network 15 includes various network elements that support voice communications and other functionalities, including mobile messaging messages. It will be understood that the various network elements can communicate with each other and other aspects of the mobile communications network 15 and other networks, e.g., the public switched telephone network (PSTN) and the Internet 23, either directly or indirectly.

The carrier also operates a number of systems that provide ancillary functions in support of the mobile communications services and/or application services provided through the system 10, and those elements communicate with other nodes or elements of the system 10 via one or more private Internet Protocol (IP) type packet data networks 29 (sometimes referred to as an Intranet), i.e., a private network. Generally, such ancillary systems are part of or connected for communication via the private network 29. It is well known, however, that systems outside of the private network could serve the same functions as well. Examples of such systems, in this case operated by the carrier or network service provider as part of the overall network 10, which communicate through the intranet type network 29, include one or more application servers, such as an application server 31 (e.g., an application server serving as a central biometric server) for providing biometric based verification of users of the mobile devices 13 based on biometric print information of the users.

The mobile devices 13 communicate over the air with a base station 17 and through the mobile communication network 15 for various voice and data communications, e.g., through the Internet 23 with a central biometric server (CBS) 21, one or more servers of various enterprises 25, and/or with the application server 31. If the carrier offers a biometric verification service, the biometric verification service may be hosted on a carrier operated application server (e.g., server 31), for communication via the networks 15 and 29. For further discussion, we will consider an example in which the verification services are hosted on the server 21. In such an example, an enterprise service receiving services of the carrier, such as online account service, may be hosted on the application server 31. In such a case, the server 31 may rely on verification service offered by the central biometric server 21.

The central biometric server 21 is one or more servers implementing a centralized biometric verification solution on a mobile communication network 15. The central biometric server 21 serves as a central data repository storing various data relating to providing biometric verification services, including information relating to mobile device users and enterprises, etc. (collectively, "biometric related information"). For example, for a user of a mobile device, the information relating to the mobile device user includes identification associated with the mobile device user, such as a mobile directory number or device serial number of the mobile device, and biometric print(s) of the mobile device user. The information relating to each enterprise includes information about the enterprise itself and access information (or data) used in providing an online service to the mobile device user via one or more servers of the enterprise. In the example, the information about the enterprise includes the names of enterprises or web addresses, and the enterprise access information includes user data for the online service, e.g., user's account number, social security number, username and password information, etc. Also, in the example, all data transmitted from or sent to the central biometric server 21 or enterprise server(s) 25 are encrypted for security purposes. That is, all communication from and to the central biometric server 21 and enterprise server(s) 25 are encrypted over a wireless connection or internet protocol (IP) connection over networks, 15, 29, and 23, and decrypted at the central biometric server 21 and enterprise server(s) 25. The encryption and decryption can be in any manner desired and performed using hardware and/or software.

Alternatively, the biometric related information can be stored in a remote database in various database type environments (e.g., using an Oracle-based database).

Alternatively, the central biometric server 21 can be implemented as a cloud application over a network in a cloud computing environment. In general, cloud computing provides a set of hosted resources, such as processors, operating systems, software and other components that can be combined together to form a virtual machine (a "cloud computing platform"). The cloud computing platform includes cloud applications that are available to client devices (e.g., in the example, mobile devices 13). The client devices access the cloud computing platform to execute the cloud applications (e.g., a cloud application for biometric based verification services), which are implemented using storage and processing resources available in the cloud computing. In the example, IBM WebSphere eXtreme Scale technology can be utilized. IBM WebSphere eXtreme Scale is a software technology providing an elastic memory based storage grid over multiple servers, enabling a faster data access than a traditional database and allowing very large memory storage (e.g., terabytes of data can be stored in a grid and then accessed from client applications that share the data within the grid). Cloud applications may comprise various pieces of different applications residing over multiple computers in a distributed computing environment.

An enterprise server 25 is implemented on one or more servers of an enterprise, e.g., any business, government, or private or public organization offering online transactions (or services) to users of the mobile devices 13 over various networks. In the example, each enterprise server 25 is installed with an application program (an "enterprise biometric application") for communicating with the central biometric server 21 and various mobile devices over a network for performing biometric based verifications. The enterprise server 25 performs various functions relating to biometric verification services for mobile device users. For example, the enterprise server 25 communicates with the mobile device 13a or 13b to obtain identification information of the mobile device 13, and communicates with the mobile device 13a or 13b to obtain a sample biometric print from the user of the mobile device 13a or 13b. The enterprise server 25 also communicates with the central biometric server 21 to determine whether or not the user is an authorized person for accessing an online service provided by the enterprise server 25. A determination as to whether or not the user is an authorized person is made by comparing the sample biometric print of the user with a stored (or registered) template biometric print of the user in the central biometric server 21. When it is determined that there is a match (e.g., a successful verification of the user), access to the online service offered by the enterprise server 25 is granted to the user of the mobile device 13a or 13b over the network. That is, in the example, upon the successful verification, the central biometric server 21 provides the enterprise server 25 with all desired enterprise data (e.g., the user's account information, social security number, password information, etc.) associated with the user for granting access to the online service by the enterprise server 25.

Alternatively, the enterprise server 25 can obtain a copy of the template biometric print of the user from the central biometric server 21 and make the verification determination based on a local comparison of the sample biometric print with the template biometric print of the user at the enterprise server 25. If the sample biometric print matches the template biometric print, the enterprise server 25 may grant the user access to the online service offered by the enterprise server 25 over the network.

In the example, as shown in FIG. 1, a database 39 is connected to the application server 31. In this case, as discussed earlier, the biometric based verification services may be hosted on the application server 31 and database 39 (e.g., the application server 31 and database 39 function as a central biometric server 21 on the network 15). The database 39 may include biometric-related information for providing the biometric based verification services to the mobile device users. Alternatively, a biometric based verification service may be provided by a separate, third party entity (alone or through agreements with the carrier), in which case the service may be hosted on an application server, such as a server 27. Servers such as 27 and 31 may also provide any of a variety of common application or service functions in support of or in addition to an application program running on the mobile device 13a or 13b. However, for the purposes of discussion herein, we will focus on functions thereof in support of provisioning a biometric based verification service. For a given service, including the biometric based verification service, an application program within the mobile device 13a or 13b may be considered as a 'client' and the programming at 21, 25, 27, or 31 may be considered as the 'server' application for the biometric based verification service.

The biometric based verification service under consideration herein may be performed using various mobile devices including touch screen type mobile stations as well as non-touch type mobile stations. Hence, our simple example shows the mobile device (MS) 13a as a non-touch type mobile station and shows the mobile device (MS) 13b as a touch screen type mobile station. Implementation of the disclosed techniques herein will involve at least some execution of programming in the mobile devices 13a and 13b and servers 21, 25, 27, or 31.

Figure 2A:
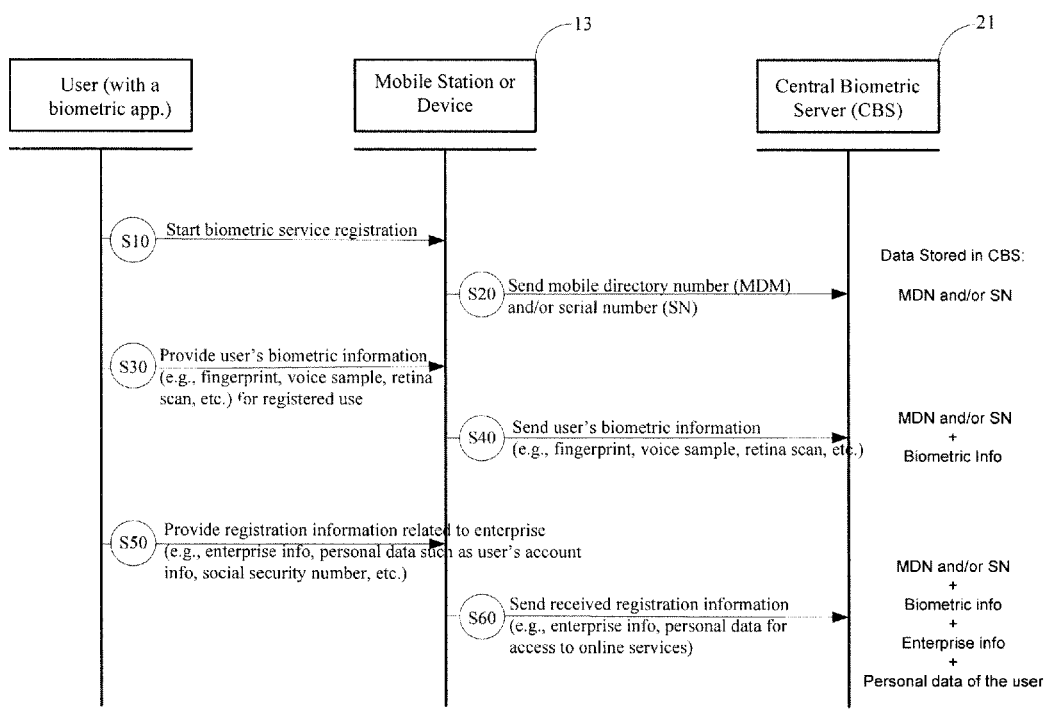
FIGS. 2A and 2B are high-level sequence diagrams of an exemplary technique for registering biometric information of a user of a mobile device.
Figure 2B:
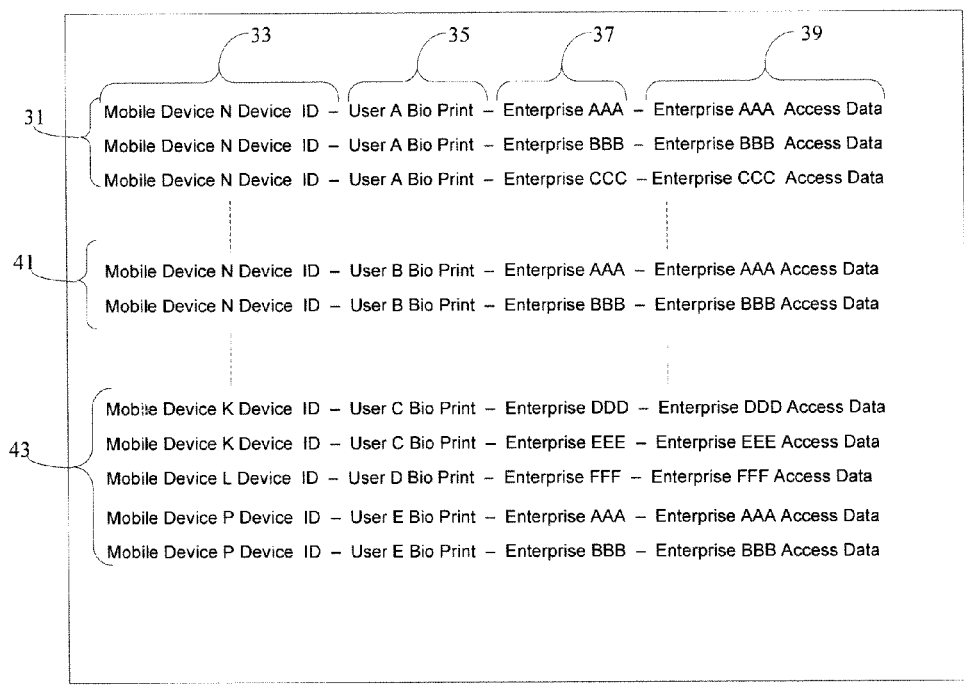

FIGS. 2A and 2B illustrate an exemplary implementation for registering a user of a mobile device for a biometric based verification service.

FIG. 2A illustrates an exemplary flow of a registration process for the biometric based verification service. In the example, it is presumed that a user of a mobile device 13 (13a or 13b) desires to use the biometric based verification service for obtaining online services using the mobile device 13. Also, it is noted that although various other messages including responses and acknowledgement messages between the mobile device 13 and central biometric server 21 are exchanged for some or all of the various transmission indicated in the figures and/or text, for discussion purposes, those messages are not shown in the figures (e.g., FIGS. 2A and 3) and are omitted in the description below.

At S10, using a pre-installed application or downloadable application (e.g., a biometric verification application) on the mobile device, the user starts a registration process for the biometric based verification service over a network. By launching the pre-installed application on the user's mobile device 13 or starting a downloaded application for the biometric based verification service, the user initiates the registration process for the service.

At S20, the mobile device 13 sends a request for registration of the user and mobile device 13 for the biometric based verification service over the mobile communication network 15 to a central biometric server (CBS) 21. The request includes identification information associated with the user, among other information in the request that may be present. The identification information associated with the user includes an identification of the user (e.g., the user's name) and an identification of the mobile device 13 (e.g., a mobile directory number (MDN), a device serial number (SN) of the mobile device 13, an integrated circuit card identification (ICCID) of a subscriber identity module (SIM), etc.). It is noted that the identification information of the mobile device 13 is not limited to MDN, SN, ICCID, or the like, and includes all other possible identification information of the mobile device 13. After receiving the registration request, the central biometric server 21 stores the received information, such as MDN and/or SN of the mobile device 13, as registration information of the user and/or mobile device 13. In another implementation, the central biometric server 21 may store the received registration information in a remote central or distributed database (not shown) over a network.

At S30, when prompted by the biometric verification application running on the mobile device 13, the user selects and provides the user's biometric print to be registered as a template biometric print of the user, such as the user's fingerprint, voice or speech sample, retinal scan, etc. In the example, the user's speech sample is used as a template biometric print of the user. The biometric verification application on the mobile device 13 acquires a speech sample from the user via an input element of the mobile device 13 (e.g., a microphone of the mobile device 13). The application may prompt the user to recite the user's name, other information associated with the various entities associated with the user and that are to use the biometric print, or a predetermined phrase configured to capture phonemes and other information enabling the central biometric server 21 to establish the identity of the user through speech recognition. Once this information is captured (or during capture), the biometric verification application on the mobile device 13 sends the acquired speech sample to the central biometric server 21 for registration and storage as a template biometric print of the user in association with the mobile device 13.

Alternatively, in place of a speech sample, a different biometric print, such as the user's fingerprint (acquired, e.g., via a touch type user input element of the mobile device 13), retinal scan (acquired, e.g., via a camera of the mobile device 13), or any other biometric print, may be used for registration purposes. In other examples, combinations of the various biometric prints can be acquired and sent to the central biometric server 21. It should be noted that once a template biometric print of a user is acquired and registered in the central biometric server 21, the template biometric print of the user is used whenever the user desires to be verified or authenticated for biometric verification services. In the example, the user is authenticated by comparing the template biometric print of the user against a later acquired sample biometric print of the user via the mobile device 13. This later process will be described in detail in reference to FIG. 3.

At S40, the mobile device 13 sends the acquired biometric print from the user (e.g., the user's fingerprint, speech sample, retinal scan, etc.) to the central biometric server 21 for registering and storing it as a template biometric print of the user in association with the mobile device 13. That is, at the central biometric server 21, the received biometric print of the user is stored in association with the identification information of the mobile device 13 (e.g., MDN and/or SN) for biometric verification purposes.

At S50, the user provides enterprise registration information on one or more enterprises that provide online services to the users of mobile devices. As noted earlier, the term "enterprise" is used herein to mean any company, organization, or entity that provides online services to the users of the mobile devices, for example, a bank, a store, etc., and that employs user verification prior to providing the online services to the users of the mobile devices. The enterprise registration information includes data relating to an enterprise (e.g., name of the enterprise, its web address, etc.) and access information (e.g., the user's personal data, such as the user's account number, social security number, etc.) that is used for granting the user access to an online service provided by the enterprise. In the example, the user's personal data may include the user's account number, social security number, birth date, residence address, password, etc.

It is should be noted that each company may also request different access information for granting the user its online service. For example, a bank may request only the user's account number and password, while an online retail store may request the user's account number, credit card information, and mailing address, etc. Based on the user's desires, the user can identify various enterprises (e.g., companies, agencies, retail stores, financial institutions, etc.) and provide access information for each enterprise for obtaining access to the online service offered by each enterprise.

At S60, after receiving from the user the enterprise registration and access information via one or more user interfaces of the mobile device 13, the mobile device 13 sends the registration and access information to the central biometric server 21 for registering the user and the mobile device 13 for the biometric based verification service. At the central biometric server 21, the registration and access information are stored as registration data for the biometric verification service. The registration data includes at least the identification information of the mobile device 13 (e.g., MDN, SN, or ICCID), the template biometric print of the user, enterprise information, and enterprise access information, all in association with each other. It should be apparent that in the description herein the identification information of the mobile device 13 is not limited to MDN, SN, ICCID, or the like, and includes all other possible identification information of the mobile device 13.

FIG. 2B illustrates exemplary registration data stored in a database of the central biometric server 21 after the registration process depicted in FIG. 2A, at a conceptual level. Each registration process for a user of a mobile device creates a record in the database for the user. The record for the user includes at least identification information associated with the user (e.g., mobile directory number, serial number of the mobile device, or the like), template biometric print(s) of the user (e.g., voice sample(s), fingerprint(s), retinal scan(s), etc.), identification information of an enterprise (e.g., name of the enterprise), and access information of the user (e.g., the user's personal data) for an online service offered by a server of the enterprise. For example, as shown at 31, registration data of a user A of a mobile device N includes identification information 33 of the mobile device N (e.g., Mobile Device N Device ID), biometric print information 35 of the user A (e.g., User A Bio Print), enterprise information 37 (e.g., names of enterprises "AAA," "BBB," and "CCC"), and enterprise access information 39 (e.g., Enterprise AAA Access Data, Enterprise BBB Access Data, Enterprise CCC Access Data) in association with each other. In another implementation, the enterprise information 37 may include a web address of the enterprise. The enterprise access information 39 includes the user's personal data (e.g., account number, social security number, passwords, address, etc. or the like) used for an online service provided by each enterprise.

Also, shown at 41 in FIG. 2B is registration data of another user B using the same mobile device N. For example, one or more people (e.g., in this case a spouse or other authorized persons) can register for the biometric based verification service using the same mobile device 13 as the user A. For example, FIG. 2B shows that another person B (e.g., a spouse of the user A) has registered for the biometric based verification service to obtain access to the online service provided by enterprises "AAA" and "BBB". Also, as shown at 43 in FIG. 2B, a user C has registered for the biometric based verification service using a mobile device K for online services offered by enterprises "DDD" and "EEE"; a user D using a mobile device L for an online service offered by an enterprise "FFF"; and a user E using a mobile device P for online services offered by the enterprises "AAA" and "BBB". It should be apparent that the data structure depicted in FIG. 2B is only for illustrative purposes and other forms and data structures can be utilized in building a database of registration data in the central biometric server 21. Alternatively, one or more database servers can be used in implementing the database of the central biometric server 21 in a distributed computing environment. It is also noted that different online services from the same enterprise may use different sets of biometric prints (or may not use biometric prints) depending on the online services and/or policies of the enterprise (e.g., the amount of security desired for the particular online service). In such a case, the exemplary registration data may include the different sets of biometric prints and enterprise access information.

Figure 3:
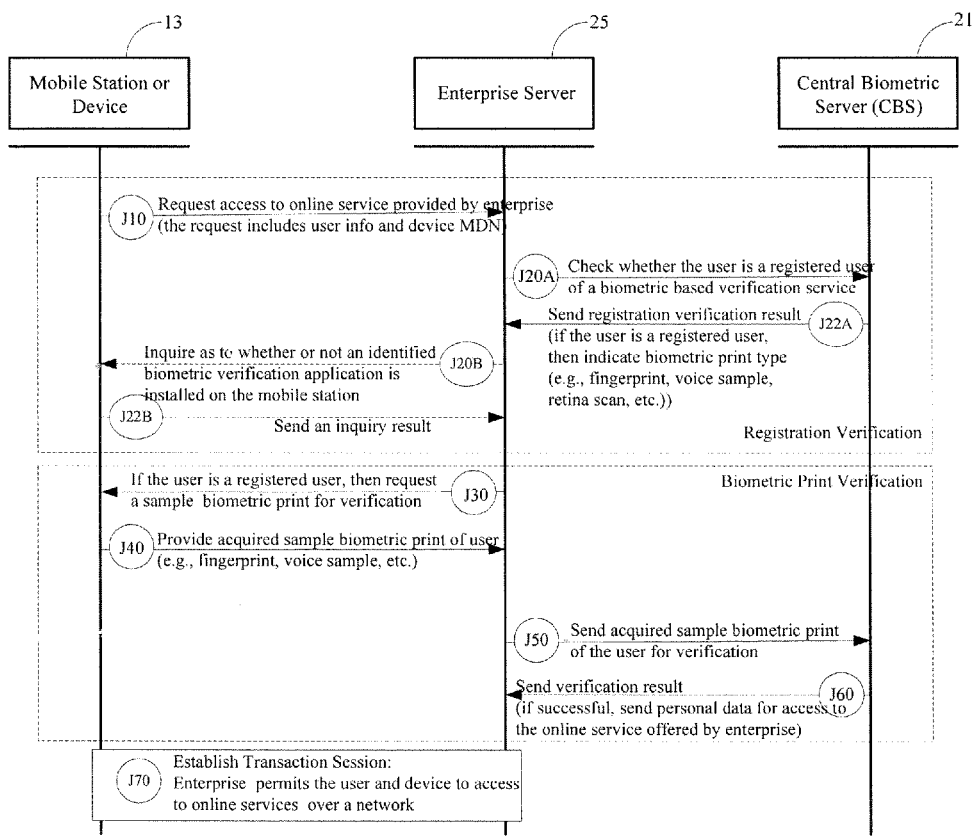
FIG. 3 is a high-level sequence diagram of an exemplary technique for verifying a mobile device user based on biometric information.

FIG. 3 illustrates an exemplary sequence of flow for performing biometric based verification of a user of a mobile device to obtain an online service from the mobile device.

At J10, using a mobile device 13, a user contacts an enterprise over one or more networks (e.g., the user connects to a website of the enterprise for an online service offered by an enterprise server 25) and requests access to the online service offered by the enterprise server 25 over the networks. As above, the networks may include a mobile communication network 15. In the example, the mobile device 13 sends a request to the enterprise server 25 for access to the online service offered by the enterprise server 25. The request includes the user information and mobile device's identification information (e.g., MDN, SN, ICCID, or the like). For the discussion purposes, it is presumed that in the description below, a mobile directory number (MDN) is used for the mobile device's identification information. At J20A, after receiving the request from the mobile device 13, the enterprise server 25 checks whether or not the user or mobile device 13 is a registered user or mobile device of the biometric based verification service provided by the central biometric server 21, by sending an inquiry request to the central biometric server 21 over a network. After receiving the inquiry request, the central biometric server 21 determines whether or not the received MDN is a registered MDN (or the user is a registered user) of the biometric based verification service by looking up the received MDN in its database (e.g., the central biometric server 21 performs a "registration verification"). In another example, the registration verification may be performed locally at each enterprise server (e.g., to reduce network traffic to the central biometric server 21) which stores information relating to registered MDNs and users for the biometric based verification service.

At J22A, when it is determined that the received MDN or user is a registered MDN or user for the biometric verification service, the central biometric server 21 sends to the enterprise server 25 a registration verification result (e.g., a successful registration verification) message indicating a registration status and type of a stored biometric print of the user. When it is determined that the received MDN or user is not a registered MDN or user for the biometric verification service, the central biometric server 21 sends to the enterprise server 25 a registration verification result message containing an unsuccessful registration verification result. Upon receiving the unsuccessful registration verification result, the enterprise server 25 informs the user of the mobile device 13 of the unsuccessful registration verification result and denies access to the online service. In such a case, the user of the mobile device 13 may be prompted for registration (of the user and mobile device 13) for the biometric based verification service.

Alternatively, the enterprise server 25 may perform the registration verification of the mobile device 13 by directly checking whether or not the mobile device 13 includes a valid, identified biometric verification application running on the mobile device 13, as shown at J20B-J22B. That is, when the request for access to the online service is received from the mobile device 13 (at J10), the enterprise server 25 may communicate over the network with the mobile device 13 to determine whether or not the user or mobile device 13 is a registered user or mobile device by checking identification information of the biometric verification application running on the mobile device 13. Specifically, the enterprise server 25 may send a query message to the mobile device 13 to receive information about the serial number, or unique code, etc. of the biometric verification application running on the mobile device 13. Responsive to the query message, at J22B, the mobile device 13 sends to the enterprise server 25 a response message including the requested information on the biometric verification application running on the mobile device 13. After receiving the response message, the enterprise server 25 may determine whether the mobile device 13 is a registered mobile device for the biometric based verification service, based on the received information from the mobile device 13.

At J30, when it is determined that the mobile device 13 is a registered mobile device (or the user is a registered user), the enterprise server 25 sends to the mobile device 13 a request for a sample biometric print of the user of the mobile device 13. The request includes an indication of the type of a biometric print to be provided by the user (e.g., a fingerprint, voice sample, retinal scan, etc.). Responsive to the request for the sample biometric print of the user, the mobile device 13 prompts the user to input the specific sample biometric print of the user. Using an appropriate input device of the mobile device 13, the user then provides the requested sample biometric print for further processing by the biometric verification application running on the mobile device 13. For example, the biometric verification application may acquire from the user a biometric print and appropriately process it (e.g., identifying a unique wave pattern of a voice sample provided by the user or areas of a fingerprint for unique arches, loops and whorls) before transmitting it to the enterprise server 25. At J40, the mobile device 13 sends the acquired sample biometric print from the user (for a biometric print verification to the enterprise server 25 for biometric verification purposes. As indicated above, the acquired sample biometric print may be encrypted before it is transmitted.

At J50, the enterprise server 25 sends the received sample biometric print of the user, along with other information including the enterprise information, to the central biometric server 21. Also, if the sample biometric print is encrypted, the enterprise server 25 decrypts and sends an unencrypted version to the central biometric server 21 over a secure network connection between two servers 25 and 21; or alternatively, the enterprise server 25 decrypts and re-encrypts using the same or a different encryption scheme for transmission over an unsecure network connection between the two servers 25 and 21. The central biometric server 21 receives and compares the received sample biometric print with the stored template biometric print of the user to determine whether the two samples match. When it is determined that the received sample biometric print substantially has matched the template biometric print, the central biometric server 21 concludes that the user of the mobile device 13 has been authenticated or verified for access to the online service offered by the enterprise server 25, and, at J60, provides the enterprise server 25 with a verification result along with enterprise access information for granting the user and the mobile device access to the online service. For example, at J60, after the user has been authenticated, the central biometric server 21 sends to the enterprise server 25 a biometric verification result including the user's personal data for accessing the online service offered by the enterprise server 25 (e.g., the user's account number, social security number, username and password, etc.). In another example, after the user has been authenticated, the central biometric server 21 may send to the enterprise server 25 the biometric verification result without access information (e.g., the user's account number, social security number, username and password, etc.) for granting the user and/or mobile device access to the online service.

After receiving a successful biometric verification result from the central biometric server 21, the enterprise server 25 grants the user or mobile device 13 access to the online service over the network. That is, at J70, after the successful biometric verification, an online session is established between the enterprise server 25 and mobile device 13 over the network. After establishing the online session, the user can proceed to conduct various transactions with the enterprise server 25 as usual. However, when the enterprise server 25 receives an unsuccessful biometric verification result from the central biometric server 21, the enterprise server 25 may deny the user or mobile device 13 any access to the online service offered by the enterprise server 25. The enterprise server 25 may send a notification to the user informing of denial of access to the online service offered by the enterprise server 25.

It should be noted that in the example of FIG. 3, only provisioning of a sample biometric print from the user for verification purposes is used in the procedures outlined in steps J10 through J70—no further user inputs, such as username and password, account number, etc. are provided. That is, to gain access to the online service offered by the enterprise server 25 the user of the mobile device 13 provides only a sample biometric print when prompted, thereby reducing the amount of the user's time during the verification process for obtaining the online service and eliminating the need for the user to remember any username and password combinations for gaining access to the online service offered by the enterprise server 25 over the network. It should be apparent that in the description herein the identification information of the mobile device 13 is not limited to MDN, SN, ICCID, or the like, and includes all other possible identification information of the mobile device 13.

The structure, programming, and operations of the various types of mobile devices are well known. However, for completeness, it may be useful to consider the functional elements/aspects of an exemplary mobile device 13b, at a high-level.

Figure 4:
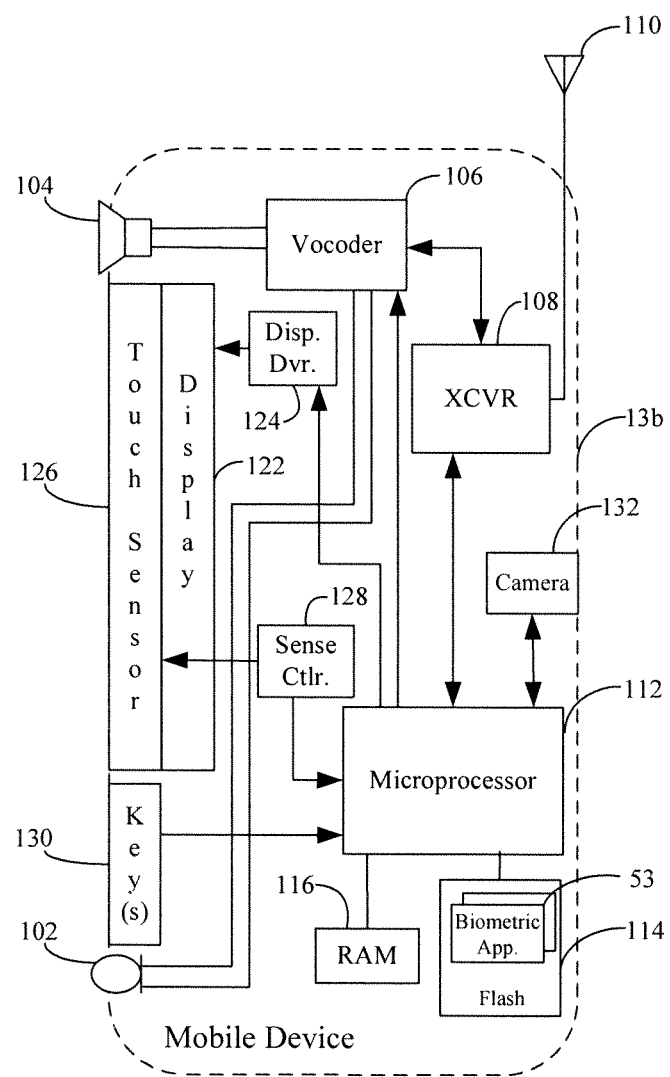
FIG. 4 is a high-level functional block diagram of exemplary mobile devices used in a network/system like that shown in FIG. 1.

FIG. 4 provides a block diagram illustration of an exemplary touchscreen type mobile device 13b. Although possibly configured somewhat differently, at least logically, a number of the elements of the exemplary touch screen type mobile device 13b are similar to elements of the non-touch type mobile device 13a. Thus, the description of the mobile device 13a is omitted herein.

Although the mobile device 13b may be a smart-phone or may be incorporated into another device, such as a personal digital assistant (PDA), a personal computer (PC), a tablet PC, an electronic reader, any other mobile device, or the like, for discussion purposes, the illustration shows the mobile device 13b is in the form of a handset. The handset embodiment of the mobile device 13b functions as a normal digital wireless telephone station. For that function, the mobile device 13b includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications. Further, in the example, the microphone 102 receives and processes a sample speech from a user of the mobile device 13b as a biometric print of the user.

For digital wireless communications, the mobile device 13b also includes at least one digital transceiver (XCVR) 108. Today, the mobile device 13b would be configured for digital wireless communications using one or more of the common cellular network technology types, such as CDMA, GSM, 3G, 4G or beyond, or the like. The mobile device 13b may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile device 13b and the communication network. Each transceiver 108 connects through RF send and receive amplifiers (not separately shown) to an antenna 110. The transceiver 108 may also support various types of mobile messaging services.

A microprocessor 112 serves as a programmable controller for the mobile device 13b, in that it controls all operations of the mobile device 13b in accord with programming that it executes, for all normal operations, and for operations involved in procedures for registering biometric prints and performing functions in support of biometric verification services (e.g., communicating with network elements, such as a central biometric server 21 and enterprise server(s) 25, as shown in FIGS. 2 and 3) under consideration here. In the example, the mobile device 13b includes flash type program memory 114, for storage of various "software" or "firmware" program routines and mobile configuration settings, such as a mobile directory number (MDN), device serial number (SN), and/or other identification number, etc.

The mobile device 13b may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and a biometric verification application (or program) 53 or the like.

The memories 114 and 116 also store various data, such as telephone numbers and server addresses, downloaded data, such as multimedia content, and various data input by the user. Programming stored in the flash type program memory 114, sometimes referred to as "firmware," is loaded into and executed by the microprocessor 112.

Of course, other storage devices or configurations may be added to or substituted for those in the example. Hence, outlined above, the mobile device 13b includes a processor, and programming including application software (e.g., a biometric verification application 53). The programming stored in the flash memory 114 configures the processor of the mobile device 13b to perform various desired functions, including in this case the functions involved in the techniques for capturing biometric prints from the user of the mobile device 13b (e.g., voice sample(s), fingerprint(s), retinal scan, etc.) and communicating with the central biometric server 21 and enterprise server 25 for biometric verification purposes, as described in reference to FIGS. 2A, 2B, and 3.

The mobile device 13b also includes a camera 132 for capturing still photographs or video. The camera 132 includes image sensors that are used in capturing images, which are generally saved in the mobile device 13b in various file formats. In the example, the camera 132 can be used to acquire a retinal scan of the user of the mobile device 13b for use as a biometric print of the user.

The biometric verification application 53 includes a mobile application that a user of the mobile device 13b can install and configure on the mobile device 13b for a biometric based verification service. The biometric verification application 53 allows the user to register and use the biometric based verification service over a network. The biometric verification application 53 enables the mobile device 13b to communicate with the central biometric server 21 over the network for registering data relating to the user and mobile device 13b. Further, the biometric verification application 53 includes functions to present to the user on the mobile device 13b various user interfaces and capture different types of biometric prints (e.g., voice samples, fingerprints, retinal scan, etc.) from the user, provided that the mobile device 13b is capable of capturing the different types of biometric prints. Alternatively, in the example, the biometric verification application 53 may automatically detect the hardware and software capability of the mobile device 13b and present to the user a relevant user interface for capturing an appropriate biometric print of the user. Also, the biometric verification application 53 may be provided with encryption and decryption capability for sending and receiving information in a secure manner over a network including the user's biometric print and personal data. Alternatively, the information including the user's biometric print and personal data can be encrypted and decrypted by third party hardware and/or software installed in the mobile device 13b.

As shown in FIG. 4, the mobile device 13b may have a limited number of keys 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display. In the example, the touchscreen display or the like can be used to recognize and acquire fingerprints of the user as biometric prints of the user for the biometric verification purposes. Also, it is noted that the camera 132 of the exemplary mobile device 13b may be used to capture fingerprints of the user.

Hence, the exemplary mobile device 13b includes a display 122, which the microprocessor 112 controls via a display driver 124, to present visible outputs to the device user. The mobile device 13b also includes a touch/position sensor 126. The sensor 126 is relatively transparent, so that the user may view the information presented on the display 122. A sense circuit 128 senses signals from elements of the touch/position sensor 126 and detects occurrence and position of each touch of the screen formed by the display 122 and sensor 126. The sense circuit 128 provides touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile device 13b. Thus, the display 122 and touch sensor 126 are configured to recognize and acquire fingerprints of the user of the mobile device 13b as the user's biometric prints for use. The microphone 102 and speaker 104 may be used as additional user interface elements, for audio input and output. Further, as noted earlier, the microphone 102 and vocoder 106 can be used to capture the user's speech samples as the user's biometric prints 13b equipped with a camera or other imaging devices 132 can be configured to recognize and acquire an image of a retinal scan of the user as a biometric print of the user.

The structure and operation of the mobile device 13b, as outlined above, were described to by way of example, only.

As shown by the above discussion, in addition to functions implemented by the mobile device, some functions relating to acquiring biometric print(s) of a user and exchanging the acquired biometric print(s) with other network elements (e.g., enterprise server 25, or central biometric server 21) may be implemented on computers connected for data communication via the components of a packet data network, operating as separate network or server elements as shown in FIG. 1. Although special purpose devices may be used, such devices also may be implemented using one or more hardware platforms intended to represent a general class of data processing device commonly used to run "server" programming so as to implement for a central biometric server 21, an enterprise server 25, and/or an application server 27, or 31 discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for implementing techniques for biometric based verification services. The software code relates to such server or network element functions and is executable by the general-purpose computer. In operation, the code is stored in a non-transitory storage medium within the general-purpose computer platform. At other times, however, the software may be stored at other locations and/or transported for loading into the appropriate general-purpose computer system. Software code for applications or other programming for the mobile devices also may be stored in a server and transmitted through the network for storage in memories of the mobile devices.

Figure 5:
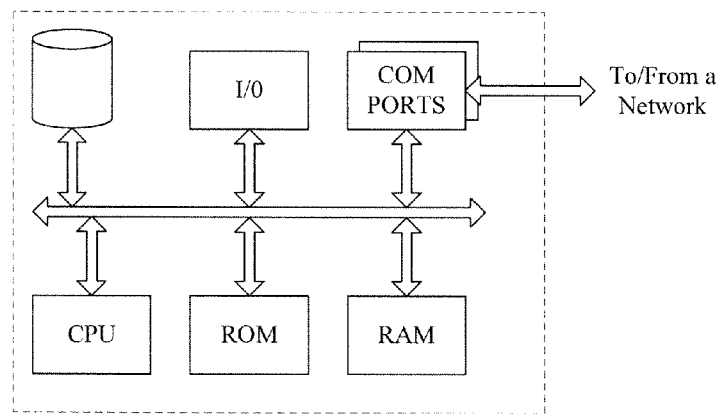
FIG. 5 is a simplified functional block diagram of a computer that may be configured as a host or server, as shown in the system of FIG. 1.
Figure 6:
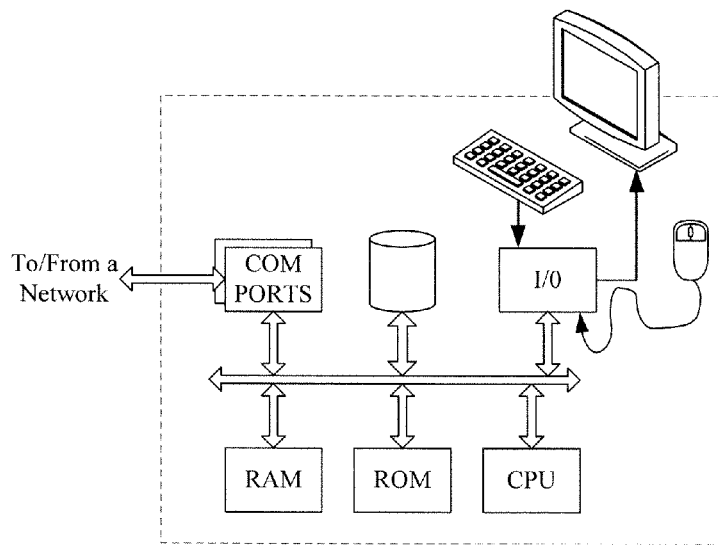
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server.

A server, for example, a central biometric server 21 or enterprise server 25, includes a data communication interface for packet data communications. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications.

In the example, a processor of the central biometric server 21 configures the server 21 to perform various functions, including functions to receive from a mobile device 13 (13a or 13b), through a mobile communication network 15, registration data of the user and mobile device 13 for biometric based verification service, for example, data on the user and enterprise(s), the identification of the mobile device 13 (MDN, SN, ICCID, or the like), user's biometric prints and personal data for access to the online services provided by the enterprise(s). The central biometric server 21 is configured to communicate with the enterprise server 25 and to provide the user's personal data to the enterprise server 25 for granting the user access to the online services offered by the enterprise server 25.

Similarly, in the example, a processor of the enterprise server 25 configures the enterprise server 25 to perform various functions, related to biometric verification services, such as receiving a request from the user for access to the services provided by the enterprise server 25; verifying whether the user and/or the mobile device is registered for the biometric based verification service; and communicating with the mobile device 13 to obtain a sample biometric print from the user for verification. The enterprise server 25 further communicates with the central biometric server 21 to verify the user's identity based on the sample biometric print obtained from the user. The enterprise server 25 is also configured to receive personal data of the user for access to the online services provided by the enterprise server 25, if the user is verified or authenticated by the central biometric server 21.

The hardware elements, operating systems and programming languages of such servers 21, 25, 27, and 31 are conventional in nature, and are well known. In addition, the server functions may be implemented in a distributed fashion on a number of similar platforms, to distribute the processing load.

FIG. 6 depicts a computer with user interface elements, as may be used to implement a personal computer or other type of work station or terminal device, although the computer of FIG. 6 may also act as a server if appropriately programmed. The structure, programming and general operation of such computer equipment are well known and as a result the drawings should be self-explanatory.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

In the preceding specification, various preferred embodiments have been described with reference to the accompanying drawings. It will, however, be evident that various modifications and changes may be made thereto, and additional embodiments may be implemented, without departing from the broader scope of the claims set forth below. The specification and drawings are accordingly to be regarded in an illustrative rather than restrictive sense.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising steps of:
receiving, at a server, a request from a mobile device over a network for access to an online service over the network, the request including user identification information associated with a user of the mobile device and mobile device identification information associated with the mobile device, the user identification information not including personal verification data of the user for accessing the online service;
based on the mobile device identification information contained in the request, determining whether the user is a registered user of a biometric based verification service;
in response to determining that the user is a registered user of the biometric based verification service, sending a request for a sample biometric print to the mobile device over the network for presentation to the user;
responsive to the request for the sample biometric print of the user, receiving over the network, at the server, from the mobile device an acquired sample biometric print of the user;
determining whether the user is an authorized user of the online service based on the received sample biometric print and a template biometric print associated with the user identification information; and
responsive to determining that the user is the authorized user of the online service, receiving, at the server, access information of the user for the online service stored in a record, the access information including the personal verification data of the user, such that the user is granted access to the online service via the stored access information, without any further interaction with the user.

2. The method of claim 1, wherein the determination as to whether the user is the authorized user of the online service comprises:
sending the acquired sample biometric print of the user to a central biometric server for comparing, at the central biometric server, the acquired sample biometric print with the template biometric print of the user;
receiving an authentication result of the user from the central biometric server; and
granting the user access to the online service over the network, without any further interaction with the user, upon successful authentication at the central biometric server.

3. The method of claim 2, wherein the receiving of the authentication result includes receiving from the central biometric server the access information of the user for the online service.

4. The method of claim 1, wherein the determining of whether the user is the authorized user of the online service comprises accessing a plurality of records, each record including identification information associated with a corresponding user and a template biometric print of the corresponding user.

5. The method of claim 4, wherein the determining of whether the user is the authorized user of the online service further comprises:

comparing, at the server, the received sample biometric print with the template biometric print of the user; and granting the user access to the online service, without any further interaction with the user, when the server determines that the received sample biometric print matches the template biometric print of the user.

6. The method of claim 5, wherein the determining of whether the user is the authorized user of the online service further comprises, when the server determines that the received sample biometric print matches the template biometric print of the user, receiving and applying the access information of the user for the online service.

7. The method of claim 1, wherein the personal verification data includes at least one of a username, a password or an account number associated with the online service.

8. An enterprise server comprising:
an interface for network communication;
a processor coupled to the interface;
a program for the processor; and
non-transitory storage for the program;
wherein execution of the program by the processor configures the enterprise server to perform functions, including functions to:
receive a request from a user of a mobile device over a network for access to an online service over the network, the request including user identification information associated with the user and mobile device identification information associated with the mobile device, the user identification information not including personal verification data of the user for accessing the online service;
based on the mobile device identification information contained in the request, determine whether the user of the mobile device is a registered user of a biometric based verification service;
when it is determined that the user is a registered user of the biometric based verification service, send a request to the user over the network for a sample biometric print of the user;
responsive to the request for the sample biometric print, receive over the network from the user the sample biometric print of the user for purposes of determining whether the user is an authorized user of the online service; and
responsive to a determination that the user is the authorized user of the online service, receive access information of the user for the online service stored in a record, the access information including the personal verification data of the user, such that the enterprise server grants the user access to the online service via the stored access information, without requiring any further inputs from the user for authentication purposes,
wherein:
the sample biometric print of the user is obtained by the mobile device,
the sample biometric print of the user is compared to a template biometric print associated with the user identification information to determine whether the user is the authorized user, and
the mobile device identification information includes at least one of a mobile directory number or serial number of the mobile device.

9. The enterprise server of claim 8, wherein the execution of the program by the processor configures the enterprise server to perform a further function to locally determine whether the user is the authorized user of the online service by comparing the sample biometric print of the user with the template biometric print associated with the user identification information.

10. The enterprise server of claim 8, wherein the execution of the program by the processor configures the enterprise server to perform a function to, based on information on a biometric verification application running on the mobile device, determine whether the mobile device is a registered mobile device of the biometric based verification service.

11. The enterprise server of claim 10, wherein the execution of the program by the processor configures the enterprise server to perform further a function to, when it is determined that the user is the authorized user, receive the access information of the user from the central biometric server.

12. The enterprise server of claim 8, wherein the execution of the program by the processor configures the enterprise server to perform further functions to:
send over the network a request to a central biometric server to determine whether the user is the authorized user of the online service provided by the enterprise server, the request including the sample biometric print of the user; and
responsive to the request, receive from the central biometric server a determination as to whether the user is the authorized user of the online service.

13. The enterprise server of claim 8, wherein the personal verification data includes at least one of a username, a password or an account number associated with the online service.

14. A server of a mobile communication service provider, comprising:
an interface for communication over a network with servers of enterprises other than the mobile communication service provider, the servers of the enterprises offering online services to users of mobile devices of customers of the mobile communication service provider;
a processor coupled to the interface;
at least one non-transitory storage device accessible by the processor;
programming in the at least one non-transitory storage device for execution by the processor; and
a database in the at least one non-transitory storage device, wherein the database includes records for the users of the mobile devices that utilize a biometric verification service provided by the server of the mobile communication service provider upon execution of the programming, each record for a respective user comprising:
identification information associated with the respective user;
a template biometric print of the respective user, received from a mobile device of the respective user through a network of the mobile communication service provider, for use in biometric authentication of the respective user upon an attempt by the respective user to access an online service offered by a server of a respective enterprise among the servers of the enterprises using the mobile device of the respective user; and
access information of the respective user that is required for the online service offered by the server of the respective enterprise, the access information of the respective user including personal verification data of the respective user,
wherein execution of the programming by the processor configures the server to perform functions, including functions to:
receive an inquiry request from the server of the respective enterprise as to whether the mobile device of the respective user is registered for the biometric based verification service, the inquiry request including an identification of the mobile device, the inquiry request responsive to the access attempt by the respective user, the access attempt including the identification of the mobile device and the identification information associated with the respective user, the access attempt not including the personal verification data of the respective user for accessing the online service, based on the received identification of the mobile device, determine whether the mobile device is registered for the biometric based verification service, when the mobile device is registered for the biometric based verification service, send to the server of the respective enterprise a response to the inquiry request including a registration status of the mobile device and identifying a type of a biometric print of the respective user for verification purposes, receive from the respective server of the enterprise a sample biometric print of the respective user of the identified type for the biometric authentication, determine whether the respective user is an authorized user by comparing the sample biometric print of the respective user with the template biometric print associated with the identification information of the respective user, and when it is determined that the respective user is the authorized user, send to the server of the respective enterprise the access information of the respective user for the online service offered by the respective enterprise, such that the user is granted access to the online service via the access information, without any further interaction with the user.

15. The server of claim 14, wherein the identification information associated with the respective user includes an identification of the user, a mobile directory number of the mobile device, or a serial number of the mobile device.

16. The server of claim 14, wherein each record further comprises:

identification information of the respective enterprise.

17. The server of claim 14, wherein execution of the programming by the processor configures the server to perform functions, including functions to:

receive from the respective user of the mobile device over the network the identification information associated with the respective user and the template biometric print of the respective user, wherein the identification information associated with the respective user includes at least one of an identification of the respective user or a mobile directory number of the mobile device;

store the received identification information associated with the respective user as registration data of the respective user for the biometric based verification service over the network;

receive over the network from the respective user of the mobile device the access information to access the online service offered by the respective enterprise; and store the access information in association with the received information associated with the respective user.

18. The server of claim 14, wherein the personal verification data includes at least one of a username, a password or an account number associated with the online service.

\* \* \* \* \*